United States Patent
Zhang et al.

(10) Patent No.: US 11,873,225 B2
(45) Date of Patent: Jan. 16, 2024

(54) MODIFIED MONTMORILLONITE SELF-REPAIRING AGENT AND PREPARATION METHOD AND USE THEREOF

(71) Applicant: Institute of Rock and Soil Mechanics, Chinese Academy of Sciences, Wuhan (CN)

(72) Inventors: Liwei Zhang, Wuhan (CN); Kaiyuan Mei, Wuhan (CN); Yan Wang, Wuhan (CN); Manguang Gan, Wuhan (CN); Xiaochun Li, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 72 days.

(21) Appl. No.: 17/675,268

(22) Filed: Feb. 18, 2022

(65) Prior Publication Data

US 2022/0267162 A1 Aug. 25, 2022

(30) Foreign Application Priority Data

Feb. 20, 2021 (CN) .......................... 202110193469.1

(51) Int. Cl.
*C01B 33/40* (2006.01)
*C04B 14/10* (2006.01)
*C04B 111/00* (2006.01)

(52) U.S. Cl.
CPC .............. *C01B 33/40* (2013.01); *C04B 14/10* (2013.01); *C04B 2111/00034* (2013.01)

(58) Field of Classification Search
CPC ................... C01B 33/40; C04B 14/10; C04B 2111/00034; C04B 2111/72; C04B 14/104; C04B 28/02; C04B 40/0039; C04B 22/08; C04B 28/00
See application file for complete search history.

(56) References Cited

PUBLICATIONS

Loring et al "In Situ Molecular Spectroscopic Evidence for CO2 Intercalation into Montmorillonite in Supercritical Carbon Dioxide", ACS Publications, dx.doi.org/10.1021/la301136w | Langmuir 2012, 28, 7125-7128 (Year: 2012).*

Furlan et al "Effect of Montmorillonite Treatment with Supercritical CO2 on the Morphology and Properties of Polypropylene Nanocomposites".ISSN 0965-545X, Polymer Science, Ser. A, 2014, vol. 56, No. 1, pp. 83-89. (Year: 2014).*

* cited by examiner

Primary Examiner — Anthony J Green

(57) ABSTRACT

The present disclosure provides a modified montmorillonite self-repairing agent and a preparation method and use thereof, and belongs to the technical field of cement repairing materials. Montmorillonite is mixed with water, such that water is fully adsorbed between montmorillonite layers. The structure of montmorillonite is modified by supercritical $CO_2$ treatment at a temperature of 50-60° C. and a pressure of 8-12 MPa, and the self-repairing efficiency of cement is improved by adding the modified montmorillonite into cement. Supercritical $CO_2$ is adsorbed by montmorillonite, such that the montmorillonite is activated and an interlayer distance is increased to improve the repairing efficiency. When a crack is formed in cement, the adsorbed supercritical $CO_2$ in montmorillonite is released into the crack and combined with positive ions to generate carbonate deposition, such that the crack is sealed and the self-repairing activity of the cement is improved. Results of examples show that carbonate microcrystals are generated in the modified montmorillonite self-repairing agent provided by the present disclosure. The generated carbonate microcrystals serve as "active sites" that induce additional carbonate precipitation, which is beneficial for crack sealing.

7 Claims, 1 Drawing Sheet

MODIFIED MONTMORILLONITE SELF-REPAIRING AGENT AND PREPARATION METHOD AND USE THEREOF

TECHNICAL FIELD

The present disclosure relates to the technical field of cement repairing materials and particularly relates to a modified montmorillonite self-repairing agent and a preparation method and use thereof.

BACKGROUND

An existing cement self-repairing agent typically falls into one of the four types of self-healing materials, i.e., precipitation material, swelling material, cross-linking material, and microbial flora. A precipitation material repairs cement by utilizing a reaction precipitate of active components, but the reaction may be difficult to regulate and control at high temperatures. A swelling material has the ability to swell and seal cracks when cracks are formed in cement, but the swelling capacity is greatly influenced by environmental conditions like pressures and temperature. Across-linking material is usually prepared from polymers but the compatibility with cement and the stability under high temperature for polymers need to be resolved. Microbial flora works via spontaneous repairing through biomineralization, but the environmental tolerance of microbes is weak and a healing effect in cement is sometimes difficult to guarantee.

Montmorillonite is a layered hydrous silicate mineral that has good adsorbability. Modification of montmorillonite by supercritical $CO_2$ enables $CO_2$ molecules to be embedded between the layers of montmorillonite, so as to improve the repairing performance of montmorillonite. The modified montmorillonite self-repairing agent can adapt to the subsurface environment of high temperature, high pressure and high concentration of acid gas, and has a low preparation cost. However, in the prior art, when the montmorillonite is modified, an organic chemical reagent is often required to be added to activate or polymerize montmorillonite. For example, in patent 1 (CN201310038965.5: a method for synthesizing a porous silica/montmorillonite nanocomposite by a one-pot method), a cationic surfactant and tetraethoxysilane were required to be introduced between layers of the montmorillonite, and modification was conducted in a supercritical $CO_2$ environment to obtain a porous silica/montmorillonite nanocomposite. In patent 2 (CN201210518920.3: a method for preparing a bifunctional organically modified montmorillonite), a coupling agent was used to modify montmorillonite by grafting, a long-chain alkyl quaternary ammonium salt or quaternary phosphonium salt was introduced, and reaction was conducted in a supercritical $CO_2$ environment to obtain a bifunctional organically modified montmorillonite. In patent 3 (CN200810201123.6: a method for preparing a copolymer nano composite material in supercritical $CO_2$), an initiator, fluorine-containing montmorillonite, a stabilizer, and reaction monomers (acrylonitrile and styrene) were utilized to react in supercritical $CO_2$. For all the aforementioned patents, the supercritical $CO_2$ is only used as a carrying agent instead of a reaction agent to modify montmorillonite. The modification is mainly achieved by various surfactants instead of supercritical $CO_2$. Besides, the introduction of surfactants can increase the production cost, also increase the waste after the modification reaction and cause environmental pollution. However, supercritical $CO_2$ can be used as a reaction agent to modify montmorillonite under ideal pressure and temperature and the supercritical $CO_2$-modified montmorillonite can serve as a cement self-repairing agent, which has not been reported before.

Therefore, it is necessary to provide a method to improve the repairing performance of montmorillonite by using supercritical $CO_2$ as a reaction agent to modify montmorillonite.

SUMMARY

The present disclosure provides a modified montmorillonite self-repairing agent and a preparation method and use thereof. The provided modified montmorillonite self-repairing agent can be used for repairing wellbore cement and has a relatively good repairing performance.

In order to realize the aforementioned objective of the present disclosure, the present disclosure provides the following technical solutions.

The present disclosure provides a preparation method of a modified montmorillonite self-repairing agent, including the following steps:

(1) after mixing nano-scale montmorillonite powder with deionized water, placing the mixture in a beaker to stand for 12-36 h, and removing a supernatant to obtain montmorillonite gel;

(2) enabling the montmorillonite gel obtained in step (1) to react with supercritical $CO_2$ to obtain a $CO_2$-modified montmorillonite gel at a temperature of 50-60° C. and a supercritical $CO_2$ pressure of 8-12 MPa; and (3) enabling the gel obtained in step (2) to go through solid-liquid separation and drying to obtain a $CO_2$-modified montmorillonite self-repairing agent.

Preferably, the nano-scale montmorillonite powder in step (1) may have a particle size of 10-100 nm.

Preferably, the nano-scale montmorillonite powder and the deionized water in step (1) may have a mass ratio of 1:(3-5).

Preferably, the reaction in step (2) may be conducted under stirring at a stirring speed of 100-300 r/min.

Preferably, the reaction in step (2) may be conducted for 4-8 h.

Preferably, the drying in step (3) is conducted at a temperature of 30-50° C. for 12-36 h.

The present disclosure provides a modified montmorillonite self-repairing agent prepared by the preparation method according to the above technical solution.

The present disclosure provides use of a modified montmorillonite self-repairing agent according to the above technical solution in repairing cement-based materials. The present disclosure provides a preparation method of a modified montmorillonite self-repairing agent, including the following steps: (1) after mixing nano-scale montmorillonite powder with deionized water, placing the mixture in a beaker to stand for 12-36 h, and removing the supernatant to obtain a montmorillonite gel; (2) enabling the montmorillonite gel obtained in step (1) to react with supercritical $CO_2$ to obtain a $CO_2$-modified montmorillonite gel at a temperature of 50-60° C. and a supercritical $CO_2$ pressure of 8-12 MPa; and (3) enabling the gel obtained in step (2) to go through solid-liquid separation and drying to obtain a $CO_2$-modified montmorillonite self-repairing agent. In the present disclosure, montmorillonite is mixed with water to prepare a gel, such that water is fully adsorbed between montmorillonite layers, and a supercritical $CO_2$ pressure is controlled to be 8-12 MPa to ensure that $CO_2$ is in a supercritical state. The repairing performance of montmorillonite is improved by a structural change of montmorillonite using supercritical $CO_2$ at a temperature of 50-60° C. Supercritical $CO_2$ treatment works by loading $CO_2$ molecules into the layers of montmorillonite. In the given pressure and temperature range, the supercritical $CO_2$ can be fully adsorbed by montmorillonite, such that the montmorillonite is activated and an interlayer distance is increased to improve the adsorption capacity. When $CO_2$-modified montmorillonite is added into cement and a crack is formed in cement, the adsorbed supercritical $CO_2$ is released into the crack and combined with positive ions to generate carbonate deposition, such that the crack is sealed and the self-repairing activity of the cement is improved. Results of examples show that the modified montmorillonite self-repairing agent provided by the present disclosure has carbonates in the layers of montmorillonite, and the carbonates serve as active sites for additional calcium carbonate precipitation, which is beneficial for crack sealing.

DETAILED DESCRIPTION

Figure 1:
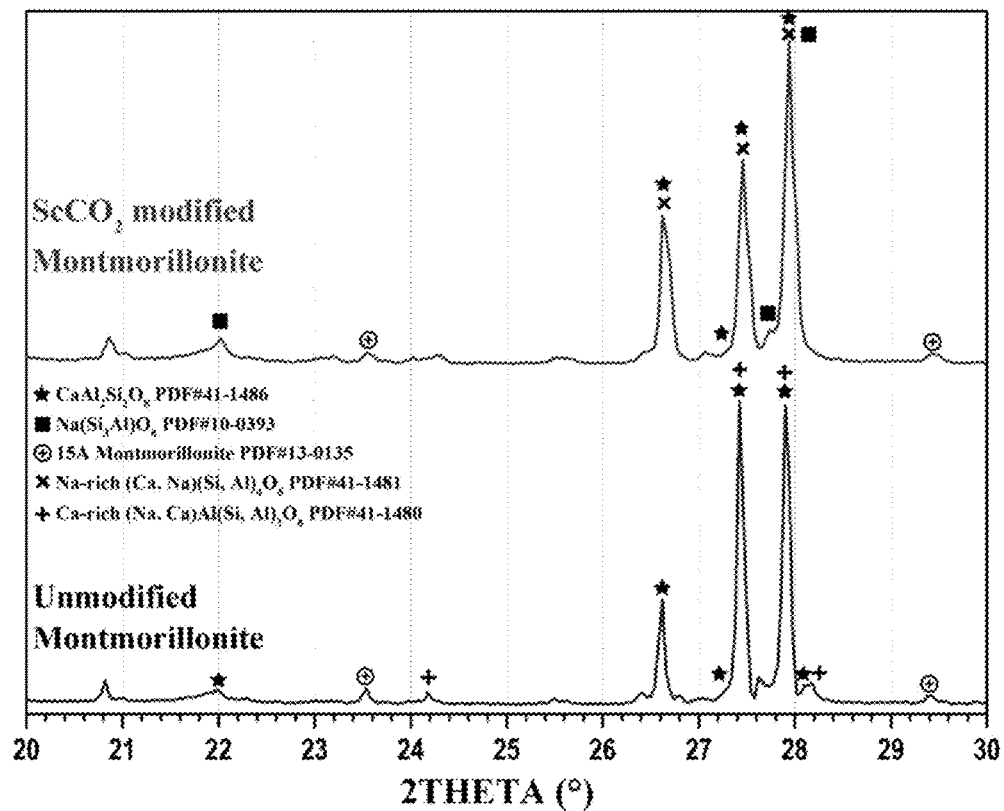
FIG. 1 is the XRD patterns of the modified montmorillonite self-repairing agent prepared in Example 1 of the present disclosure, and industrial-grade montmorillonite prepared in Example 2 (for comparison purpose) of the present disclosure.

The present disclosure provides a preparation method of a modified montmorillonite self-repairing agent, including the following steps:

(1) after mixing nano-scale montmorillonite powder with deionized water, placing the mixture in a beaker to stand for 12-36 h, and removing the supernatant to obtain a montmorillonite gel;

(2) enabling the montmorillonite gel obtained in step (1) to react with supercritical $CO_2$ to obtain a $CO_2$-modified montmorillonite gel at a temperature of 50-60° C. and a supercritical $CO_2$ pressure of 8-12 MPa; and (3) enabling the gel obtained in step (2) to go through solid-liquid separation and drying to obtain a $CO_2$-modified montmorillonite self-repairing agent.

In the present disclosure, nano-scale montmorillonite powder is with deionized water, standing is conducted and the supernatant is removed to obtain a montmorillonite gel.

In the present disclosure, a preparation method of the nano-scale montmorillonite powder may preferably include screening industrial-grade montmorillonite and removing particles with larger particle sizes to obtain the nano-scale montmorillonite powder. The present disclosure has no specific limitations on the source of the industrial-grade montmorillonite and commercially available products may be adopted.

In the present disclosure, the nano-scale montmorillonite powder may preferably have a particle size of 10-100 nm (most preferably 30-70 nm). The nano-scale montmorillonite powder of the present disclosure is used as a raw material, such that montmorillonite layers can fully adsorb water.

In the present disclosure, the nano-scale montmorillonite powder and the deionized water may preferably have a mass ratio of 1:(3-5), most preferably 1:4.

In the present disclosure, the mixing may be preferably conducted in a stirring manner. The stirring speed and time are not particularly regulated in the present disclosure, as long as the nano-scale montmorillonite powder and the deionized water can be evenly stirred. The nano-scale montmorillonite powder and the deionized water can be well mixed by using the stirring method of the present disclosure, such that the montmorillonite layers can fully adsorb water.

In the present disclosure, the standing may be preferably conducted for 12-36 h. In the present disclosure, a montmorillonite gel can be deposited below the supernatant by standing, such that the supernatant is convenient to be removed.

After the montmorillonite gel is obtained, the montmorillonite gel reacts with supercritical $CO_2$ to obtain a $CO_2$-modified montmorillonite gel.

In the present disclosure, the reaction may be preferably conducted in a reaction kettle and the montmorillonite gel may preferably have a volume of ½ to ¼ of that of the reaction kettle, most preferably ⅓.

In the present disclosure, preferably, the montmorillonite gel is added to the reaction kettle and supercritical $CO_2$ is pumped into the kettle to ensure that the space above the gel is filled with supercritical $CO_2$.

In the present disclosure, a method for introducing supercritical $CO_2$ may preferably include the following steps:

Injecting $CO_2$ into the reaction kettle through a syringe pump to remove air in the reaction kettle; turning off the air outlet of the reaction kettle and injecting the $CO_2$ through the syringe pump into the kettle to achieve a desired pressure.

In the present disclosure, the supercritical $CO_2$ pressure in the kettle is 8-12 MPa, preferably 9-11 MPa. In the present disclosure, the pressure is restricted within the above range, such that the $CO_2$ is in a supercritical state and the repairing performance of $CO_2$-modified montmorillonite reaches optimum. Given this pressure condition, the supercritical $CO_2$ fully enters the interlayer spaces of the montmorillonite, the efficiency of the supercritical $CO_2$ as a modifier is greatly improved, and the $CO_2$ adsorbed between the layers of montmorillonitecan play a self-repairing role when the $CO_2$-modified montmorillonite is added into cement.

In the present disclosure, the reaction may be preferably conducted under stirring and the stirring may preferably have a rate of 100-300 r/min, most preferably 150-250 r/min. The present disclosure has no specific limitation on the stirring method and a conventional stirring method may be used. In the present disclosure, the reaction is conducted at a temperature of 50-60° C., preferably 55° C. and conducted preferably for 4-8 h, most preferably 5-7 h. The reaction temperature is strictly controlled. If the reaction temperature is too high, the reaction product rapidly grows and active carbonate microcrystals are not easy to form. If the temperature is too low, $CO_2$ cannot reach a supercritical state and the strong permeating ability of the supercritical $CO_2$ is lost. As a result, the $CO_2$ cannot enter montmorillonite layers to serve as an active modifier. In short, the reaction temperature is restricted in the range of 50-60° C. to ensure that the supercritical $CO_2$ can be adsorbed by montmorillonite layers as much as possible, and an optimal rate of carbonate formation in montmorillonite layers is maintained. The carbonates formed in montmorillonite layers serve as "active sites" to induce additional carbonate deposition in cement cracks, so that the cracks can be sealed and the self-repairing activity of the cement is improved.

After the reaction is completed, in the present disclosure, the pressure may be preferably maintained for cooling, and the pressure is released after cooling to a room temperature to obtain a $CO_2$-modified montmorillonite gel.

After the gel is obtained, the gel is sequentially subjected to a solid-liquid separation and drying to obtain a modified montmorillonite self-repairing agent.

In the disclosure, the solid-liquid separation is preferably conducted by a suction filtration. The present disclosure has no specific limitations on the suction filtration and a suction filtration method well known to those skilled in the art may be adopted.

In the present disclosure, the drying may be preferably conducted at 30-50° C., most preferably 40° C. and conducted for 12-36 h (most preferably 24 h). In the present disclosure, the drying temperature is strictly controlled. The $CO_2$ loaded between the layers needs to be prevented from escaping due to excessively high temperature, which reduces the activity of the modified montmorillonite. An excessively low temperature requires long drying time, which greatly reduces the yield of the modified montmorillonite.

The present disclosure provides a modified montmorillonite self-repairing agent prepared by the preparation method according to the above technical solution. In the present disclosure, carbonate microcrystals are generated in the modified montmorillonite self-repairing agent, and the carbonate microcrystals serve as "active sites" that induce additional carbonate precipitation in cement cracks, which is beneficial for crack sealing.

The present disclosure provides use of the modified montmorillonite self-repairing agent according to the above technical solution in repairing cement-based materials. In the present disclosure, the cement-based materials may preferably be wellbore cement or other cement-based materials. The modified montmorillonite self-repairing agent needs to be added into cement slurry before slurry solidification to have self-repairing capacity. The modified montmorillonite self-repairing agent provided by the present disclosure can quickly repair cracks in cement-based materials and can be used in various applications like geologic $CO_2$ storage, enhanced oil recovery, etc. Given strict control of montmorillonite particle size, reaction pressure and temperature, supercritical $CO_2$ has a great modification effect on montmorillonite as a main reactant.

The technical solutions in the present disclosure will be clearly and completely described below in conjunction with the examples of the present disclosure. All other applications obtained by a person of ordinary skill in the art based on the examples of the present disclosure without creative efforts shall fall within the protection scope of the present disclosure.

Example 1

A preparation method of a modified montmorillonite self-repairing agent specifically included the following steps:

(1) Industrial-grade montmorillonite was screened to remove larger particles and obtain nano-scale montmorillonite powder with a particle size of 10-100 nm. The nano-scale montmorillonite powder was mixed with deionized water at a mass ratio of 1:4. Stirring was conducted and standing was conducted for 24 h after stirring. In the end, the supernatant was removed to obtain a montmorillonite gel;

(2) The temperature of the reaction kettle was set to 50° C. When the temperature became stable, the montmorillonite gel obtained in step (1) was added to the reaction kettle, and the montmorillonite gel preferably had a volume of ⅓ of the internal volume of the reaction kettle, and a magnetic rotor was added. $CO_2$ was injected into the reaction kettle through a syringe pump to remove air in the reaction kettle. After all the air was removed, the air outlet of the reaction kettle was turned off, and the $CO_2$ was injected through the syringe pump to achieve a desired pressure of 10 MPa. The stirring rate in the reaction kettle was controlled to be 200 r/min After reaction for 6 h, the pressure was released and the temperature was lowered to room temperature, and a reaction gel with $CO_2$-modified montmorillonite was obtained;

(3) The reaction gel obtained in step (2) was poured into a suction filtration device, and the water was removed to obtain a solid-phase product. The solid-phase product was placed in a drying oven and dried at a temperature of 40° C. for 24 h to obtain a modified montmorillonite self-repairing agent.

Figure 2:
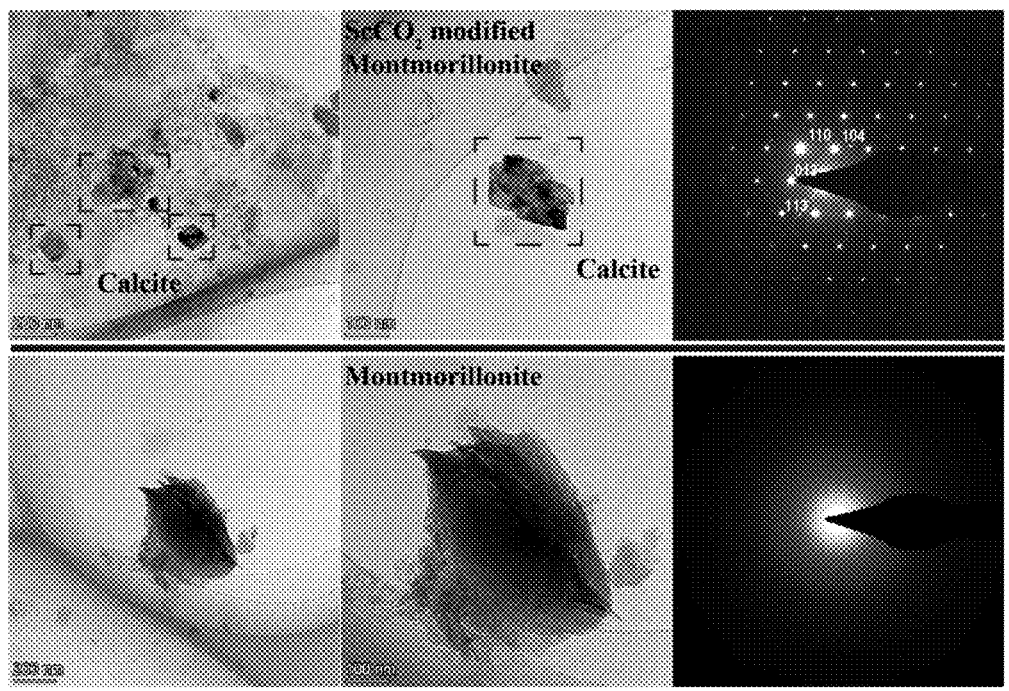
FIG. 2 is the TEM images of the modified montmorillonite self-repairing agent prepared in Example 1 of the present disclosure, and the industrial-grade montmorillonite prepared in Example 2 (for comparison purpose) of the present disclosure.

The XRD phase diagram of the modified montmorillonite self-repairing agent prepared in example 1 of the present disclosure was shown in FIG. 1. After reacting with $CO_2$, the peaks of Ca-rich montmorillonite (PDF #41-1480) were weakened, implying that the original Ca-rich montmorillonite was converted into Na-rich montmorillonite (PDF #41-1481). FIG. 2 was an image of the modified montmorillonite, clearly showing formation of calcite microcrystals. The results in FIG. 1. and FIG. 2 imply that some calcium ions in the original Ca-rich montmorillonite are combined with bicarbonate ions to formcalcite microcrystals, which provide "active sites" that induce additional carbonate precipitation. The additional carbonate precipitation is beneficial for crack sealing.

Example 2 (for Comparison Purpose)

Unmodified industrial-grade montmorillonite from the same source as example 1.

FIG. 1 also had an image of the industrial-grade montmorillonite prepared in example 2. It can be seen from FIG. 1 that there was only one montmorillonite phase (PDF #41-1480, Ca-rich montmorillonite) in the sample.

The above descriptions are merely preferred implementations of the present disclosure. It should be noted that a person of ordinary skill in the art may further make several improvements and modifications without deviating from the principle of the present disclosure, but such improvements and modifications should be deemed as falling within the protection scope of the present disclosure.

The invention claimed is:

1. A preparation method of a modified montmorillonite self-repairing agent, comprising the following steps:
   (1) mixing nano-scale montmorillonite powder with deionized water to obtain a mixture, placing the mixture in a beaker to stand for 12-36 h, and removing supernatant from the mixture to thereby obtain a montmorillonite gel;
   (2) enabling the montmorillonite gel obtained in step (1) to react with supercritical $CO_2$ to obtain a $CO_2$-modified montmorillonite gel;
   (3) enabling the gel obtained in step (2) to go through solid-liquid separation and drying to obtain a $CO_2$-modified montmorillonite self-repairing agent.

2. The preparation method according to claim 1, wherein the nano-scale montmorillonite powder in step (1) has a particle size of 10-100 nm.

3. The preparation method according to claim 1, wherein the nano-scale montmorillonite powder and the deionized water in step (1) have a mass ratio of 1:(3-5).

4. The preparation method according to claim 1, a pressure of the supercritical $CO_2$ in the step (2) is 8-12 MPa and a reaction temperature is 50-60° C.

5. The preparation method according to claim 1, wherein the reaction in step (2) is conducted under stirring at a stirring speed of 100-300 r/min.

6. The preparation method according to claim 1, wherein the reaction in step (2) is conducted for 4-8 h.

7. The preparation method according to claim 1, wherein the drying in step (3) is conducted at a temperature of 30-50° C. for 12-36 h.

\* \* \* \* \*